United States Patent
Pai et al.

(10) Patent No.: US 10,289,285 B2
(45) Date of Patent: May 14, 2019

(54) GLOBALLY SCALABLE SOLUTION

(71) Applicants: Yogish Pai, San Francisco, CA (US); Steve George Goyette, San Francisco, CA (US); Robert Bruce MacMartin, Delta (CA); Bharath Kadaba, San Francisco, CA (US); Narayana Hari, Mountain View, CA (US); Jayanth Saimani, Bangalore (IN); Anshu Verma, Bangalore (IN); Anil Sharma, Bangalore (IN); Kiran Aswath, Bangalore (IN); Merrin Kurian, Bangalore (IN)

(72) Inventors: Yogish Pai, San Francisco, CA (US); Steve George Goyette, San Francisco, CA (US); Robert Bruce MacMartin, Delta (CA); Bharath Kadaba, San Francisco, CA (US); Narayana Hari, Mountain View, CA (US); Jayanth Saimani, Bangalore (IN); Anshu Verma, Bangalore (IN); Anil Sharma, Bangalore (IN); Kiran Aswath, Bangalore (IN); Merrin Kurian, Bangalore (IN)

(73) Assignee: Intuit Inc., Mountain View, CA (US)

( * ) Notice: Subject to any disclaimer, the term of this patent is extended or adjusted under 35 U.S.C. 154(b) by 546 days.

(21) Appl. No.: 14/954,949

(22) Filed: Nov. 30, 2015

(65) Prior Publication Data
US 2017/0123634 A1    May 4, 2017

(30) Foreign Application Priority Data
Oct. 30, 2015   (IN) .......................... 1126/KOL/2015

(51) Int. Cl.
*G06Q 10/06* (2012.01)
*G06F 3/0484* (2013.01)

(52) U.S. Cl.
CPC ..... *G06F 3/04842* (2013.01); *G06Q 10/0633* (2013.01)

(58) Field of Classification Search
CPC ..................... G06F 3/04842; G06Q 10/0633
See application file for complete search history.

(56) References Cited

U.S. PATENT DOCUMENTS 8,340,628 B2 * 12/2012 Taylor .................... H04W 4/02
  455/404.1
8,631,065 B2 *  1/2014 Dargahi ................ G06Q 10/00
  709/203

(Continued)

FOREIGN PATENT DOCUMENTS

WO    2004104892 A2    12/2004
WO    2015030839 A1     3/2015

OTHER PUBLICATIONS

Bastin Tony Roy Savarimuthu, "Towards a multi-lingual workflow system—a practical outlook", [Online], 2004, pp. 205-210, [Retrieved from Internet on Jan. 4, 2019], <http://delivery.acm.org/10.1145/980000/976473/p205-savarimuthu.pdf>.*

(Continued)

*Primary Examiner* — Ziaul A Chowdhury
(74) *Attorney, Agent, or Firm* — Ferguson Braswell Fraser Kubasta PC

(57) ABSTRACT

A system to configure a software solution involves a system that includes (i) a configuration service executing on a computer processor and configured to select, based on a user attribute of a user, a configurable user interface from multiple configurable user interfaces of the software solution, and select, based on the user attribute of the user, a configurable workflow from multiple configurable workflows of (Continued)

the software solution, (ii) a computer server configured to perform a pre-determined task by at least receiving, via the configurable user interface, a user input, and executing, based on user input and according to the configurable workflow, multiple functional engines of the software solution, and (iii) a data repository configured to store the multiple configurable user interfaces and the multiple configurable workflows.

15 Claims, 5 Drawing Sheets

(56) References Cited

U.S. PATENT DOCUMENTS

| | | | |
|---|---|---|---|
| 8,856,670 B1 | 10/2014 | Thakur et al. | |
| 8,893,108 B1* | 11/2014 | Pfeiffer | G06F 8/65 705/31 |
| 9,600,155 B2* | 3/2017 | Hale | G06F 3/04842 |
| 2003/0055669 A1* | 3/2003 | Ryan | G06Q 10/10 705/1.1 |
| 2004/0019540 A1* | 1/2004 | William | G06Q 10/10 705/31 |
| 2006/0074730 A1* | 4/2006 | Shukla | G06Q 10/06 705/7.27 |
| 2007/0174338 A1 | 7/2007 | Liggett | |
| 2007/0226343 A1* | 9/2007 | Bishop | G06F 8/61 709/226 |
| 2008/0040676 A1* | 2/2008 | Garg | G06F 9/451 715/762 |
| 2009/0327002 A1* | 12/2009 | Chapman | G06Q 10/06 705/7.27 |
| 2010/0017247 A1* | 1/2010 | Liu | G06Q 10/0633 705/7.27 |
| 2011/0004837 A1 | 1/2011 | Copland et al. | |
| 2011/0059748 A1* | 3/2011 | Taylor | H04W 4/02 455/456.1 |
| 2012/0123987 A1* | 5/2012 | Deshpande | G06Q 10/0633 706/46 |
| 2012/0137235 A1 | 5/2012 | T S et al. | |
| 2012/0311135 A1* | 12/2012 | DeLuca | G06F 9/44505 709/224 |
| 2013/0212234 A1* | 8/2013 | Bartlett | G06Q 10/0633 709/220 |
| 2014/0114823 A1* | 4/2014 | Pai | G06Q 40/123 705/31 |
| 2014/0173480 A1* | 6/2014 | Krane | G06F 3/04842 715/766 |
| 2014/0317595 A1 | 10/2014 | Kilby et al. | |
| 2014/0357312 A1* | 12/2014 | Davis | G06F 3/04842 455/550.1 |
| 2015/0095975 A1* | 4/2015 | Barton | G06F 9/45533 726/1 |
| 2015/0279171 A1* | 10/2015 | Hyde | G06F 3/04842 340/815.4 |
| 2015/0350443 A1* | 12/2015 | Kumar | H04M 3/5232 379/265.13 |
| 2016/0072681 A1* | 3/2016 | Rawat | G06F 3/04842 715/736 |
| 2016/0169696 A1* | 6/2016 | Butts, III | G01C 21/3476 701/438 |
| 2016/0202958 A1* | 7/2016 | Zabel | G06F 8/34 717/105 |
| 2018/0012158 A1* | 1/2018 | Cholewinski | G06Q 10/0633 |

OTHER PUBLICATIONS

Michel Riguidel, "Creating a new security for tomorrow's communication networks and information systems", [Online], 2000, pp. 401-418, [Retrieved from Internet on Jan. 4, 2019], <https://link.springer.com/content/pdf/10.1007/BF02994847.pdf>.*

International Search Report corresponding to PCT/US2015/062892, dated Jul. 29, 2016 (3 pages).

Written Opinion corresponding to PCT/US2015/062892, dated Jul. 29, 2016 (8 pages).

* cited by examiner

GLOBALLY SCALABLE SOLUTION

CROSS-REFERENCE TO RELATED APPLICATIONS

This application claims priority to Indian Patent Application No. 1126/KOL/2015, filed on Oct. 30, 2015 in the Indian Intellectual Property Office, under 35 U.S.C. § 119 (a). The entire contents of Indian Patent Application No. 1126/KOL/2015 are hereby incorporated by reference.

BACKGROUND

Local regulations and/or norms exist through out various geographical or jurisdictional regions for conducting business. A product marketed or used in each region needs to comply and/or support the local regulation/norm to be competitive. Similarly, different types of users of a product may have different requirements for various aspects of the product. A product targeting multiple types of users needs to support varying requirements of different types of users to be competitive. Internet based promotion and distribution have accelerated and broadened market reach of products to global customers. Customizing a product to support a wide range of regional requirements and satisfy vastly different types of users reachable via Internet is a time consuming task. Techniques for customizing a product prior to the Internet era is not scalable to meet the challenges created by the Internet based promotion and distribution. Without overcoming these challenges, a global product targeting a vast number of different types of users across international regions cannot compete with a local product focusing on a single type of users.

SUMMARY

In general, in one aspect, the invention relates to a system to configure a software solution. The system includes (i) a configuration service executing on a computer processor and configured to select, based on a user attribute of a user, a configurable user interface from a plurality of configurable user interfaces of the software solution, and select, based on the user attribute of the user, a configurable workflow from a plurality of configurable workflows of the software solution, (ii) a computer server configured to perform a pre-determined task by at least receiving, via the configurable user interface, a user input, and executing, based on user input and according to the configurable workflow, a plurality of functional engines of the software solution, and (iii) a data repository configured to store the plurality of configurable user interfaces and the plurality of configurable workflows.

In general, in one aspect, the invention relates to a system to configure a software solution. The method includes selecting, based on a user attribute of a user, a configurable user interface from a plurality of configurable user interfaces of the software solution, selecting, based on the user attribute of the user, a configurable workflow from a plurality of configurable workflows of the software solution, and performing a pre-determined task of the user by at least receiving, from the user via the configurable user interface, a user input, and executing, based on user input and according to the configurable workflow, a plurality of functional engines of the software solution.

In general, in one aspect, the invention relates to a non-transitory computer readable medium storing instructions to configure a software solution. The instructions, when executed by a computer processor, including functionality for selecting, based on a user attribute of a user, a configurable user interface from a plurality of configurable user interfaces of the software solution, selecting, based on the user attribute of the user, a configurable workflow from a plurality of configurable workflows of the software solution, and performing a pre-determined task of the user by at least receiving, from the user via the configurable user interface, a user input, and executing, based on user input and according to the configurable workflow, a plurality of functional engines of the software solution.

Other aspects of the invention will be apparent from the following detailed description and the appended claims.

DETAILED DESCRIPTION

Figure 1:
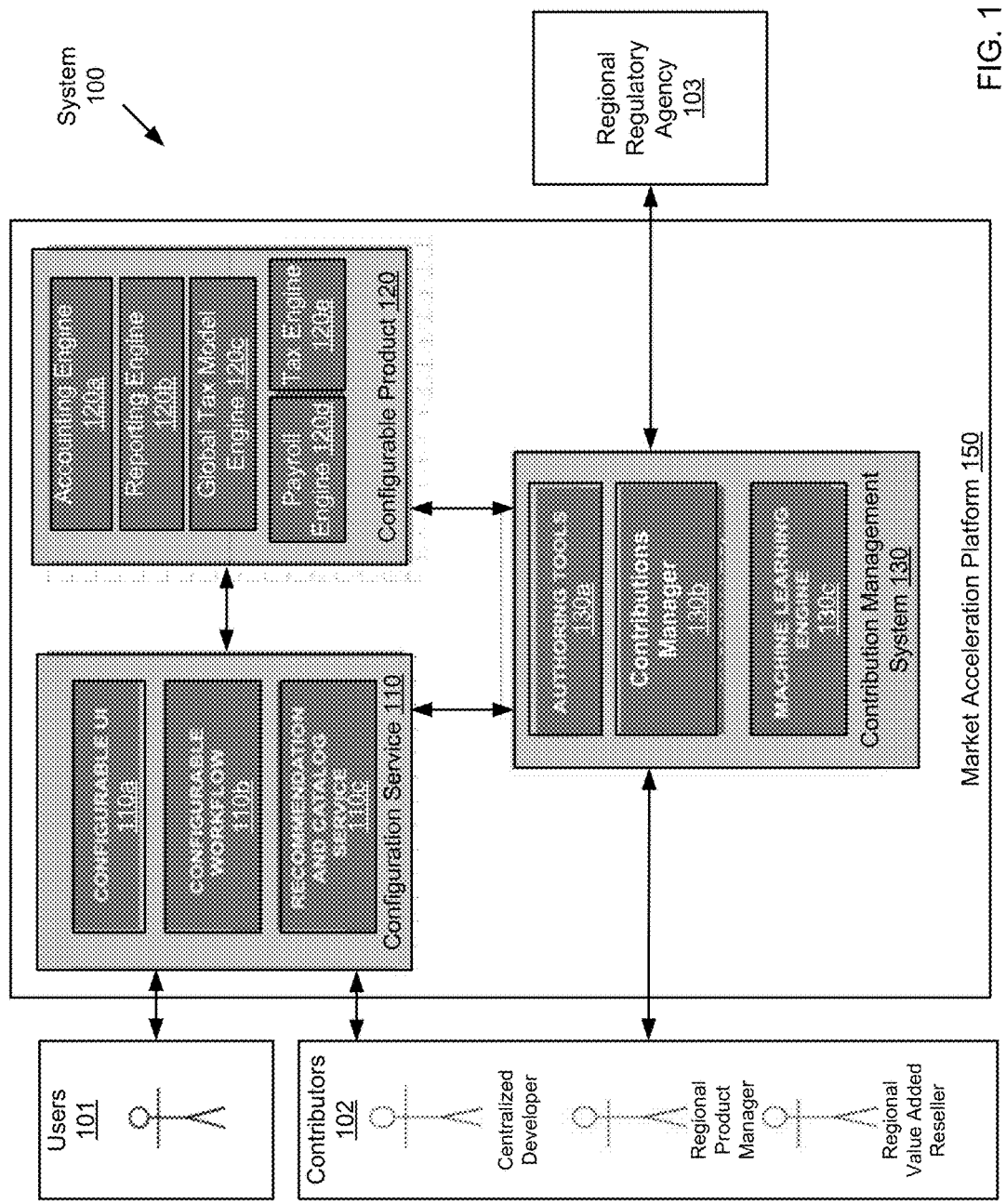
FIG. 1 shows a schematic diagram of a system for globally scalable software in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout this disclosure, the terms "internationalization" and "localization" refer to adapting computer software to different languages, regional differences, and regulatory requirements of a target market, such as a geographical or jurisdictional region. Internationalization is the process of designing a software solution so that the application can be adapted to various regional requirements without substantial engineering changes. Localization is the process of adapting internationalized software for a specific region by adding locale-specific components and translating text based on a language specific to the region. Throughout this disclosure, the term "geographic region" refers to a region with a set of regulatory requirements/laws under the control of a system of courts or government entity which are different from neighboring regions. Generally, the regulatory requirements are imposed on local business entities to report various regulated aspects of their business activities on a periodic basis. For example, a tax jurisdiction corresponds to a region where the regulatory requirements include a set of tax laws under the control of local government entities.

In one or more embodiments of the invention, the terms "internationalization" and "localization" are collectively referred to as "scaling" a software solution. Aspects of this disclosure focus on the global scaling of a software solution designed and provided centrally by the software provider. In one or more embodiments, scaling may also refer to adapting a hardware product to different languages, regional differences, and regulatory requirements of a target market, such as a geographical or jurisdictional region.

There is a secular shift to cloud adoption in progress worldwide in the small business space. In one or more embodiments of the invention, the globally scaled software solution includes a cloud-based financial management solution for small businesses across the world, such as a product that speaks the local language, is compliant to the local norms and regulations, and greatly simplifies worldwide users' bookkeeping and accounting responsibilities while allowing them to focus on running their business and serving their customers.

The market opportunity provided by the secular shift to the cloud is a massive one. A software provider in the domestic market may become the same, trusted brand to small-businesses world-wide, including developed economies such as those of the European Union, as well as rapidly emerging economies such as Brazil and India. In one or more embodiments of the invention, a system and method are based on or associated with a Market Acceleration Platform (MAP). The MAP allows the software provider to enter new markets quickly, with low cost and high quality, as well as to stay compliant in these markets in real-time after entry. The MAP allows the software provider to overcome barriers encountered by prior art approaches such as: (i) requirements gathering, product design and implementation based on one-market-at-a time, (ii) monolithic, inflexible, non-extensible, everything-in-code implementation approach, and (iii) centralized, serialized market prioritization and execution. The MAP solves the issues of these prior art approaches by (i) performing market requirements analysis in-the-large to scout groups of related markets together (e.g., common wealth countries, countries of the EU, Latin American), which unearths common themes in product requirements, and (ii) taking a metadata-driven, configurable approach to product development that leverages the common themes in product requirements to maximize code re-use through configuration, enables product extensibility to create user-level configuration and facilitates product enrichment/refinement by a worldwide network of third-party developers, local market experts (e.g., local accountants), and small business end users. In other words, with the gain in speed and flexibility in product development, the MAP allows the software provider to explore decentralized, parallelized go-to-market strategies.

The key principles that guide the technology and architecture of the MAP include the following:
a. designing the platform components that enable configurability to be domain-agnostic and re-usable across in-house developers of the software provider;
b. developing the platform components in a just-in-time fashion staying in tune with the needs of the products/offerings;
c. developing domain specific capabilities in a manner that is configurable;
d. defining the configuration metadata language/syntax in a manner that is coherent, specific where needed, and extensible where appropriate;
e. designing for enterprise-to-enterprise (E2E) performance such that the offerings are configurable and metadata driven with consideration for performance impact and appropriate measures of near-caching and far-caching strategies;
f. progressively investing in authoring tools that allow non-engineers to specify software configurations; and
g. allowing incremental support of a newly identified local requirement to be configurable at runtime to the extent possible, and not depend on formal software release cycles.

As to be expected, there are significant differences (i.e., variances) in terms of what the scalable software product needs to support in each market in order to be competitive. At a high-level, from the ecosystem perspective, the aspects that exhibit the most variance include bank feeds, data-in/data-out variability (import/export), billing, payments, and compliance variance in local accounting and payroll. In summary, the MAP focuses on clearly identifying and delineating the areas of variance, solidifying the non-varying core, and providing an architecture that exploits the commonality across markets while allowing the software product to be configured and extended to implement the variances.

For example, the major areas of variance may include chart of accounts, indirect taxes, reports, and transaction forms. Each of these areas is described below.

Chart of Accounts

Chart of accounts is a foundational feature of many accounting solutions, and refers to the list of accounts created by a business to record transactions for income and expense in a collection of accounting records commonly referred to as the general ledger. Across the global markets, the charts of accounts may vary from being very flexible (e.g., in United States) to being highly prescriptive (e.g., France and other European Union countries).

Indirect Taxes

An indirect tax is commonly defined as an indirect tax that is collected by an intermediary (e.g., a retail store) from the person (e.g., a consumer) who bears the ultimate economic burden of the tax. Examples of the indirect tax include sales tax, value added tax (VAT), goods and services tax (GST), and other specific taxes. The indirect tax may be levied at the point-of-sale, or at the time of invoicing. A business, acting as a tax collector for a tax agency, is required to maintain accurate accounting for and to track and report such taxes collected in compliance with local norms and standards. Specifically, the business is required to perform necessary filings and submit associated tax payments to the applicable agencies.

Reports

Reports are another critical aspect of variance across markets, and form a core feature that enables small businesses to gain critical insight into how their business is performing. Some examples of common reports include profit-and-loss report, Balance sheet, cash-flow report, etc.

Transaction Forms

Transaction forms are the primary means of representing the activities a small business has with customers and vendors. Examples of transaction forms include invoices, sales receipts, etc. These forms may exhibit a high degree of variance from market to market, and is a prime candidate to be made configurable.

Embodiments of the invention provide a method, system, and computer readable medium for customizing a product based on user contributions. In one or more embodiments of the invention, a customizable component of the product is configured for a user based on customization of the product made by similar users, i.e., users within a similar region and/or having a similar business requirement. In one or more embodiments of the invention, the product may include hardware, software, or a combination thereof. In an example of software product, the customizable component of the product may correspond to a user interface, a business workflow, a tax structure and/or a report layout of an internationalized online financial solution, each or a portion of which is configured in the localization process to comply with jurisdiction requirement of a geographic region.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a configuration service (110), a configurable product (120), a contribution management system (130), a regional regulatory agency (103), users (101), and contributors (102). In one or more embodiments of the invention, various components of the system (100) are coupled via a computer network (not shown). For example, the computer network may include wired and/or wireless portions of public and/or private data network, such as wide area networks (WANs), local area networks (LANs), Internet, etc. In one or more embodiments of the invention, various components of the system (100) collectively form a Market Acceleration Platform (MAP) (150). Each of these components is described in detail below.

In one or more embodiments of the invention, the MAP (150) includes hardware and software components for executing the configuration service (110), configurable product (120), and contribution management system (130). In one or more embodiments, the MAP (150) includes a web-based solution such that the users (101) and contributors (102) interact with the MAP (150) using web browsers on respective user devices (e.g., computing and communication devices). In one or more embodiments, the computing and communication devices may include a desktop computer, notebook computer, tablet computer, or other suitable mobile computing devices such as a smartphone. In one or more embodiments, a copy of at least a portion of the MAP (150) is downloaded onto user devices where the users (101) and contributors (102) interact with the downloaded copy via a user interface (UI) menu displayed on the user device.

In one or more embodiments of the invention, the configurable product (120) may be a software solution, such as an accounting software, a financial software, a web service, or any other solution. In one or more embodiments of the invention, the configurable product (120) includes one or more configurable engines, such as an accounting engine (120a), a reporting engine (120b), a global tax model engine (120c), a payroll engine (120d), and a tax engine (120e) that perform various functions of the configurable product (120). In this context, these configurable engines are also referred to as functional engines of the configurable product (120). In one or more embodiments, these configurable engines include customizable components, such as a tax structure, a report layout, a calculation formula, or any other jurisdiction/region dependent component. In one or more embodiments, the customizable components are customized by the users (101) and/or contributors (102) to configure a customized copy of the configurable product (120) for performing a pre-determined task. For example, the pre-determined task may include generating a sales or purchase document (e.g., invoice, purchase order, sales order, receipt, payment request, etc.), preparing a tax agency filing (e.g., income tax filing, sales tax filing, etc.), preparing an accounting report (e.g., proposal, quotation, billing statement, payable report, expense report, etc.), etc. according to tax jurisdiction or other regulatory requirements of a particular geographical region. For example, the customizable component may be a tax structure and performing the pre-determined task within the geographical region may include at least calculating a tax amount based on a customizable tax rate in the tax structure.

Continuing with FIG. 1, in one or more embodiments of the invention, the users (101) are individuals or business entities who use the configurable product (120). In addition, the contributors (102) are individuals or business entities who contribute to localization or other customization of the configurable product (120). Some of the users (101) and contributors (102) may be members of a user community. The user community may be, for example, a group of accountants working in a particular geographical region who jointly contribute to localization of the configurable product (120) such that the resultant localized version of the configurable product (120) is shared within the user community. Other examples of the contributors (102) include an engineer (referred to as centralized developer), a regional product manager, and/or a regional value added reseller of the software provider providing the configurable product (120). In one or more embodiments, a single configurable product (120) is localized into multiple local versions each applicable to one of many geographical regions worldwide. In particular, each local version is localized from the single configurable product (120) based on contributions from multiple regional product managers, multiple regional value added resellers, and/or other multiple contributing users located in the corresponding geographical region. In this context, each corresponding geographical region is referred to as a local market among a large number of local markets of the configurable product (120) throughout the world.

In one or more embodiments of the invention, the users (101) and contributors (102) are equipped with computing and communication devices (not shown) for interacting with the MAP (150). For example, the contributors (102) may use the computing and communication devices to submit explicit contributions to the MAP (150) for localization of the configurable product (120). In one or more embodiments, the users (101) use the computing and communication devices to access the MAP (150) and manually customize the configurable product (120). Information regarding such manual customization may be captured by the MAP (150) as implicit contributions for localization of the configurable product (120).

In one or more embodiments of the invention, the configuration service (110) includes configurable user interfaces (UIs) (e.g., configurable UI (110a)), configurable workflows (e.g., configurable workflow (110b)), and a recommendation and catalog service (110c). In one or more embodiments, the configuration service (110), more specifically the recommendation and catalog service (110c), is configured to organize a set of configurable UIs and a set of configurable workflows that are indexed, or otherwise cataloged, based on user attributes. In one or more embodiments, the configurable UI (110a) is a graphical user interface for the user to interact with the configurable product (120). In one or more embodiments, the configurable workflow (110b) is a sequence of actions undertaken by the configurable product (120) according to business logic to perform the aforementioned pre-determined task.

Continuing with FIG. 1, in one or more embodiments, the user attributes include a geographical region, a business characteristic, or other aspects of each of the users (101). In one or more embodiments, the configuration service (110), more specifically the recommendation and catalog service (110c), is configured to select, based on a user attribute of a user, the configurable UI (110a) from a set of configurable user interfaces of the configurable product (120). In one or more embodiments, the configuration service (110), more specifically the recommendation and catalog service (110c), is configured to select, based on a user attribute of a user, the configurable workflow (110b) from a set of configurable workflows of the configurable product (120). In one or more embodiments, the set of configurable user interfaces and the set of configurable workflows of the configurable product (120) are stored in a data repository (not shown) of the MAP (150). In one or more embodiments, the data repository may include a disk drive storage device, a semiconductor storage device, a database management system, other suitable computer data storage device, or combinations thereof. In one or more embodiments, content stored in the data repository may be a data file, a linked list, a data sequence, a database, a graphical representation, or any other suitable data structure. In one or more embodiments of the invention, the data repository includes functionality to store data for the MAP (150).

In one or more embodiments, the user attribute includes a geographical region of the user. In such embodiments, the configurable UI (110a) and the configurable workflow (110b) are defined based on at least a compliance requirement of the geographical region. In one or more embodiments, the user attribute includes a business characteristic of the user. In such embodiments, the configurable UI (110a) and the configurable workflow (110b) are defined based on the business characteristic of the user.

In one or more embodiments of the invention, the configurable product (120) performs the aforementioned pre-determined task of the user by first configuring one or more configurable engines based on the user attribute of the user. Subsequent to configuring the configurable engines, the configurable product (120) performs the pre-determined task by receiving one or more user inputs via the selected configurable UI (110a) and executing one or more configurable engines based on the received user inputs and according to the selected configurable workflow (110b).

Continuing with FIG. 1, in one or more embodiments of the invention, the contribution management system (130) includes authoring tools (130a), a contributions manager (130b), and a machine learning engine (130c). Each of these elements is described below.

In one or more embodiments, the authoring tools (130a) are configured to obtain, from a contributing user (e.g., one of the contributors (102)), a suggestion to customize the configurable product (120). In particular, the suggestion is based on a business requirement specific to the user attribute of a user. In one or more embodiments, the contributing user shares the same user attribute of the user and possesses expertise with respect to the business requirement specific to the user attribute. In one or more embodiments, the contributing user has different user attributes than the user, but still possesses expertise with respect to the business requirement specific to the user attribute. In one or more embodiments, the contributing user provides the suggestion based on a request from the MAP (150). In this context, the suggestion is referred to as an explicit contribution.

In one or more embodiments, the contributions manager (130b) is configured to obtain, from a moderator user (e.g., one of the contributors (102)) and in response to the moderator user reviewing the business requirement specific to the user attribute of the user, a moderator input regarding the suggestion. Accordingly, the contributions manager (130b) generates one or more configurable UIs, one or more configurable workflows, and/or one or more configuration parameters based at least on the suggestion and the moderator input. For example, the suggestion may explicitly specify an element of the configurable UI (110a), a step or sequence of the configurable workflow (110b), and/or one or more configuration parameters. In addition, the moderator input includes an approval of the specified UI element, workflow step/sequence, and/or configuration parameter. In one or more embodiments, the configuration parameters are data items used to customize one or more of the functional engines of the configurable product (120). In this context, the configuration parameters are referred to as metadata for customizing the functional engines of the configurable product (120). Examples of the configuration parameters are described in reference to FIG. 3A and FIG. 3B below.

Continuing with FIG. 1, in one or more embodiments, the contributions manager (130b) generates the configurable UIs, configurable workflows, and/or configuration parameters using the machine learning engine (130c). In one or more embodiments, the machine learning engine (130c) is configured to generate a statistical measure of the users (101) by tracking/monitoring/analyzing (i.e., "learning") the behavior of how the users (101) use the configurable product (120). Specifically, the statistical measure represents a statistical behavior of the users (101) using the set of configurable UIs, the set of configurable workflows, and the configuration parameters of the configurable product (120) to perform the aforementioned pre-determined task. In this context, the users (101) are said to provide implicit contributions for localizing/customizing the configurable product (120) during the course of using the configurable product (120). For example, the statistical measure may include a statistical distribution of user selections among the configurable UIs, configurable workflows, and configuration parameters. In addition, the statistical measure may further include a correlation between the statistical distribution and user attributes of the users (101).

In one or more embodiments, the machine learning engine (130c) is further configured to verify the set of configurable UIs, the set of configurable workflows, and the set of configuration parameters based on the statistical measure. For example, each configurable UI, configurable workflow, and/or configuration parameter may correspond to a correlation between user attributes and selections among the configurable UIs, configurable workflows, and configuration parameters.

In summary, the contribution management system (130) verifies the set of configurable user interfaces, the set of configurable workflows, and the set of configuration parameters using a machine learning algorithm that is based on at least the user attributes of the users (101) and the contributing user attributes of the contributors (102) who submitted corresponding implicit and explicit contributions. Accordingly, the configuration service (110) may select, as a recommendation to a user, the configurable UI (110a), the configurable workflow (110b), and other corresponding configuration parameters that are organized/indexed in the aforementioned data repository of the MAP (150) by matching the user to the user attributes and contributing user attributes who have contributed the implicit and explicit contributions.

In one or more embodiments, the contributions manager (130b) is further configured to obtain the aforementioned compliance requirement from a regional regulatory agency (103) or other third party in the geographical region.

Figure 2:
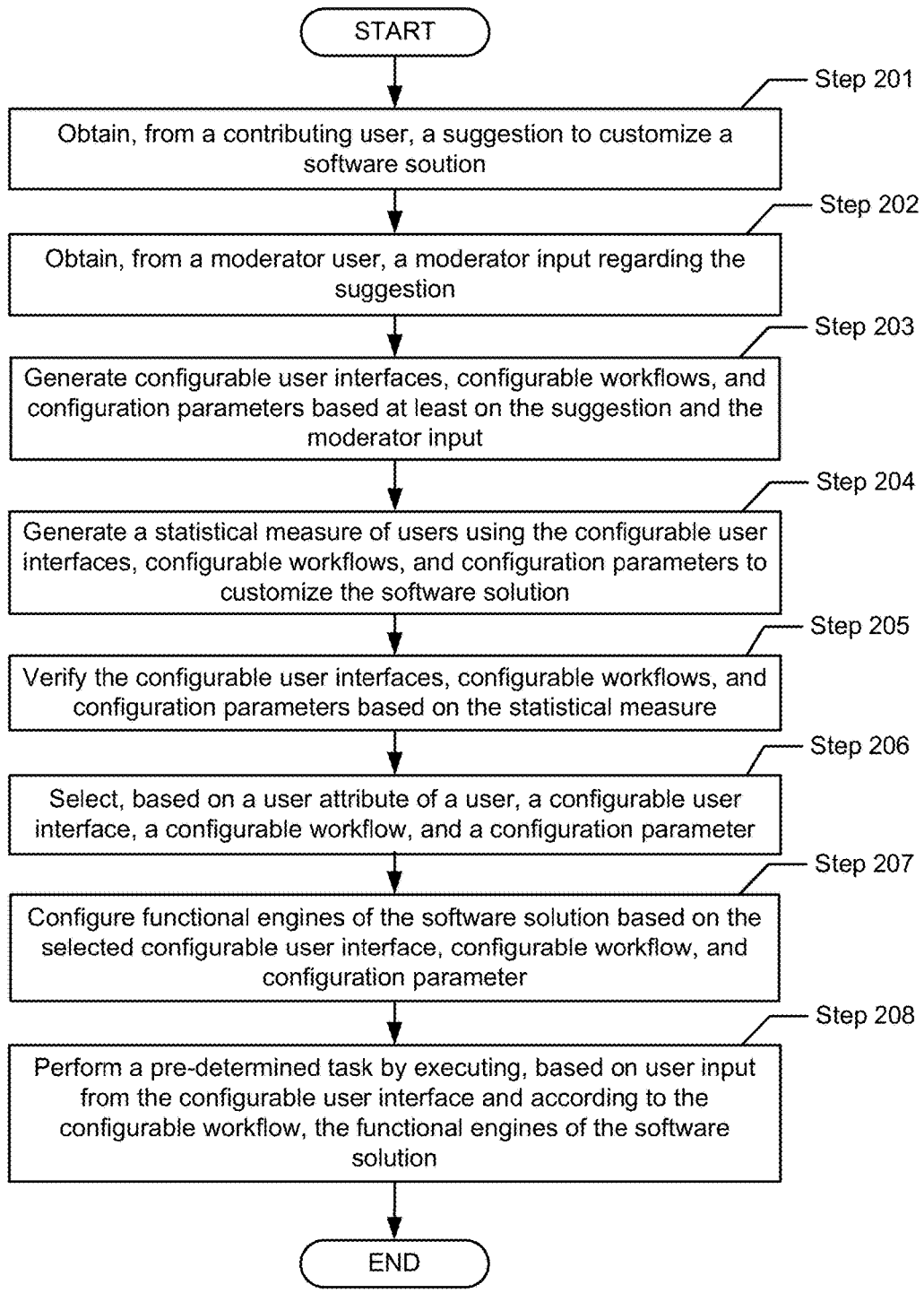
FIG. 2 shows a flowchart of a method for globally scalable software in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above and/or involving the computing system (400) described in reference to FIG. 4.

As noted above, techniques for customizing a product or solution to be scalable and meet the challenges created by Internet-based promotion and distribution is advantageous. Scalability allows a global product or solution targeting a vast number of different types of users across international regions to compete with a local product focusing on a single type of user.

The method described in reference to FIG. 2 provides scalability by employing a crowd sourcing technique that is rooted in the Internet technology. Generally, crowd sourcing is the process of obtaining needed services, ideas, or content by soliciting contributions from a large group of people, and especially from an online community, rather than from traditional employees or suppliers. In particular, crowd sourcing is distinguished from out sourcing in that the work comes from an undefined public rather than being commissioned to a specific, named group. Because the result of generic crowd source comes from the undefined public, it is important to monitor the process and maintain the quality of the result. In one or more embodiments of the invention, the method described in reference to FIG. 2 employs a statistical qualification procedure to ensure the quality of customizing a product using the crowd sourcing technique. Specifically, the product may take the form of an online software solution.

Initially in Step 201, a suggestion is obtained from a contributing user to customize a software solution. In one or more embodiments of the invention, the suggestion is based on a business requirement specific to a user attribute of a user of the software solution. In one or more embodiments, the software solution is initially developed by a centralized development team of a global software provider that provides the software solution. In contrast, the contributing user and the user of the software solution may be located in geographical locations throughout the world.

In Step 202, in response to reviewing the business requirement specific to a user attribute of the user, a moderator input regarding the suggestion is obtained from a moderator user. In one or more embodiments, the moderator user belongs to the centralized development team. In one or more embodiments, the moderator user is located away from the centralized development team and in geographical locations throughout the world.

In Step 203, configurable user interfaces, configurable workflows, and configuration parameters are generated based at least on the suggestion and the moderator input. In one or more embodiments of the invention, the configurable user interfaces, configurable workflows, and configuration parameters are generated further based on a compliance requirement obtained from a local regulatory agency of the geographical region. In one or more embodiments, the configurable user interfaces, configurable workflows, and configuration parameters are generated automatically without manual intervention.

In Step 204, a statistical measure of a group of users is generated. In one or more embodiments of the invention, the statistical measure represents how the group of users uses the configurable user interfaces, configurable workflows, and configuration parameters to customize the software solution for performing a pre-determined task. In one or more embodiments, the statistical measure is generated using a machine learning algorithm based on a correlation between user attributes of the group of users and selections made by the group of users among the configurable user interfaces, configurable workflows, and configuration parameters to customize the software solution.

In Step 205, the configurable user interfaces, configurable workflows, and configuration parameters are verified based on the statistical measure. In one or more embodiments of the invention, the configurable user interfaces, configurable workflows, and configuration parameters are verified using the machine learning algorithm. Specifically, verifying the configurable user interfaces, configurable workflows, and configuration parameters requires that the aforementioned correlation meets a pre-determined criterion. In one or more embodiments, prior to the verification, the configurable user interfaces, configurable workflows, and configuration parameters are adjusted using the machine learning algorithm until the aforementioned correlation meets the pre-determined criterion.

In Step 206, based on a user attribute of a user, a configurable user interface, a configurable workflow, and a configuration parameter are selected from the configurable user interfaces, configurable workflows, and configuration parameters generated in the Step 205. In one or more embodiments of the invention, the selection is based on a match between the user attribute of the user and user attributes of contributing users who provided suggestions to the selected configurable user interface, the selected configurable workflow, and the selected configuration parameter.

In Step 207, one or more functional engines of the software solution are configured based on the user attribute of the user. Specifically, the one or more functional engines are configured based on the selected configurable user interface, the selected configurable workflow, and the selected configuration parameter.

In Step 208, subsequent to configuring the functional engines of the software solution based on the user attribute of the user, a pre-determined task of the user is performed. In one or more embodiments of the invention, the pre-determined task is performed by (a) receiving a user input from the user via the selected configurable user interface and (b) executing, based on user input and according to the selected configurable workflow, one or more functional engines of the software solution.

Figure 3A:
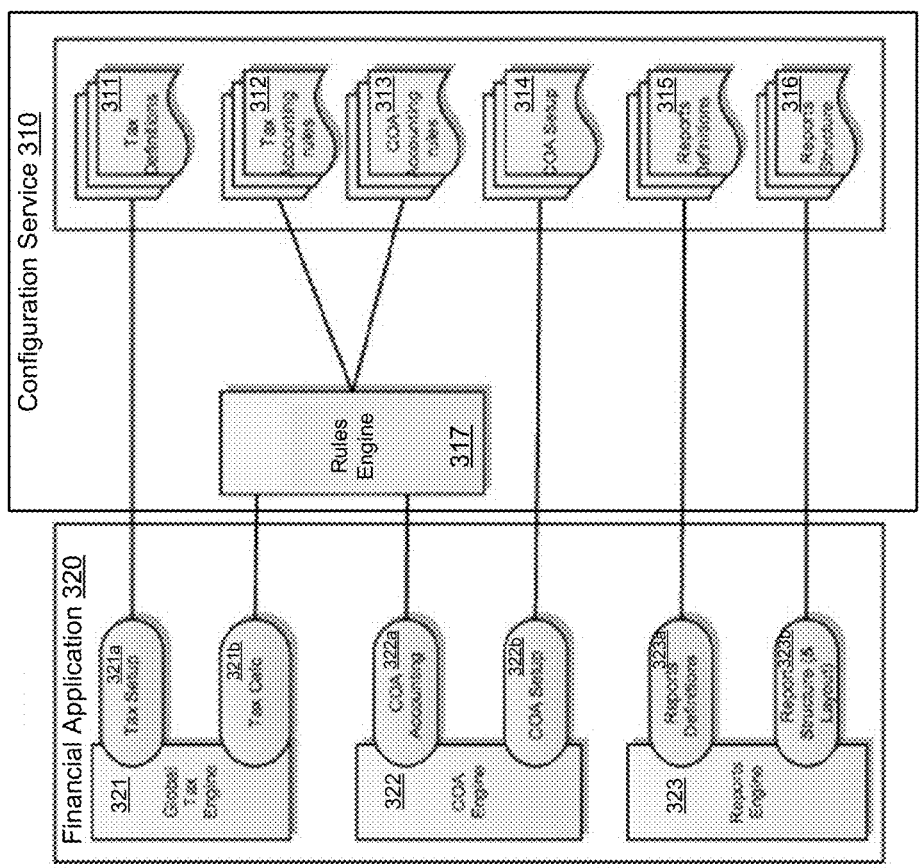
FIG. 3A and FIG. 3B show an example of globally scalable software in accordance with one or more embodiments of the invention.
Figure 3B:
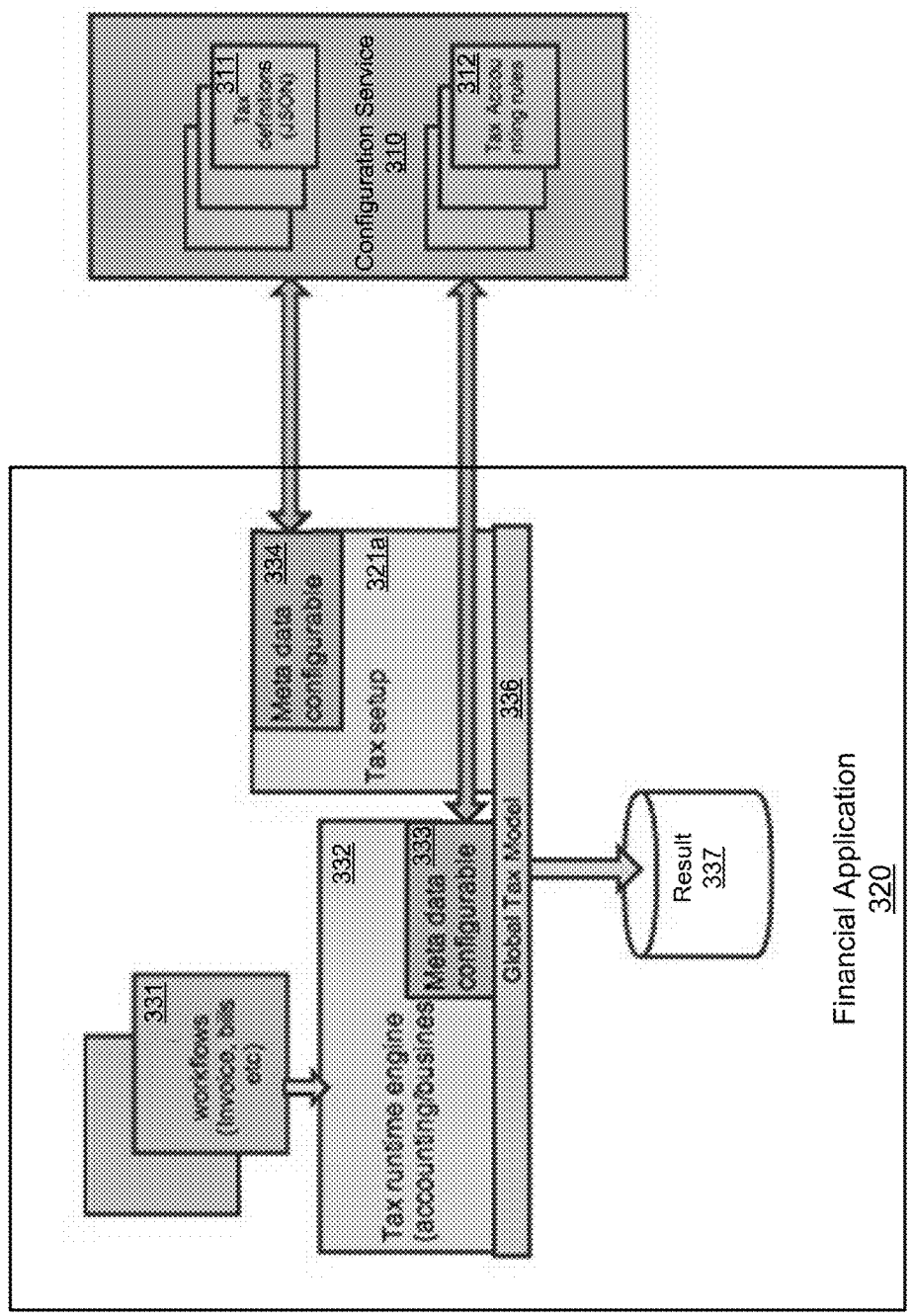

FIG. 3A and FIG. 3B each show an application example of globally scalable software in accordance with one or more embodiments of the invention. This application example may be practiced using the system (100) of FIG. 1 or the computing system (400) of FIG. 4, and based on the method described with respect to FIG. 2 above.

FIG. 3A shows an example of the MAP described above. Specifically, FIG. 3A shows details of a financial application (320) and configuration service (310), which are examples of the configurable product (120) and configuration service (110), respectively, depicted in FIG. 1 above. As shown in FIG. 3A, the financial application (320) includes a global tax engine (321) associated with a tax setup module (321a) and a tax calculation module (321b), a chart of accounts (COA) engine (322) associated with a COA accounting module (322a) and a COA setup module (322b), and a reports engine (323) associated with a reports definitions module (323a) and a report structure & layout module (323b). Further, the configuration service (310) includes a rules engine (317) and various configuration information (e.g., configuration parameters, templates, rules, etc.), such as the tax definitions (311), tax accounting rules (312), COA accounting rules (313), COA setup (314), reports definitions (315), and reports structure (316).

In the example shown in FIG. 3A, the financial application (320) is customized for a user in a particular region by using various modules of the global tax engine (321), the COA engine (322), and the reports engine (323) to receive configuration information from the configuration service (310). For example, the tax setup module (321a) receives the tax definitions (311), the COA setup module (322b) receives the COA setup (314), the reports definitions module (323a) receives the reports definitions (315), and the report structure & layout module (323b) receives the reports structure (316). In addition, the tax calculation module (321b) and the COA accounting module (322a) are configured based on the rules engine (317) using the tax accounting rules (312) and the COA accounting rules (313).

For example, the set up of chart of accounts, which exhibits high variance across markets, has been made completely configurable, with no code changes. The management of the master list of all COA's for different regions has been refactored into the configurable rules engine (317), and the configuration metadata that drives the behavior of the rules engine (317) is maintained in the configuration service (310) as the COA accounting rules (313).

In another example, the indirect tax is a key concern to the financial application (320) that has to determine what accounts are used to hold the collected indirect taxes according to the local norms and/or regulations in the local markets. As an invoicing system, in addition to core financial management, the financial application (320) also needs to be able to help the SBO (i.e., small business owner) determine when an indirect tax needs to be collected, how much needs to be collected, and the point in the course of completing business transaction that this tax is owed (i.e., tax point).

FIG. 3B shows additional details of the financial application (320) and the configuration service (310) that provides ability for the SBO to derive necessary insights into the indirect taxes they have collected, and the workflows that directly or indirectly enable the SBO in their obligation to file the taxes owed to the appropriate tax agencies in an accurate and timely fashion.

As shown in FIG. 3B, tax setup (321a) has been made configurable through the tax definitions (311) and tax accounting rules (312) that are served out of the configuration service (310) as metadata (333) and (334). A portion of the metadata (334) may also correspond to the company profile of the SBO. With new taxes defined by the tax definitions (311) and tax accounting rules (312), the tax setup module (321a) is able to set up the tax structures based on the metadata (334). In addition, the global tax engine (321) shown in FIG. 3A has been partitioned into the tax runtime engine (332) and the global tax model (336). Accordingly, the tax runtime engine (332) is able to apply any incremental tax changes or tax updates directly through metadata (333). Once the tax structures are set up by the tax setup module (321a) and the tax runtime engine configured based on the metadata (333), workflows (331) are performed to generate the result (337), such as an invoice or a bill. For example, the invoice or bill is in the local language, conforms to the format of local practice, and includes taxes in compliance with local regulation.

Although not explicitly shown in FIGS. 3A and 3B, the workflows (331) and other configuration information maintained by the configuration service (310) are acquired or otherwise generated using a contribution system (e.g., the contribution management system (130) depicted in FIG. 1 above) that is layered on top of the configuration capabilities of MAP. For example, the contribution management system (130) makes it possible to empower the financial application provider's extended network of partners, accountant communities and even SBOs themselves to configure and fine-tune financial application (320) to the right "fit" for a given market. In particular, this extended community may include two distinct types of players, namely (a) accountants and other expert contributors and (b) SBOs themselves.

In the case of accountants and other expert contributors, their contributions are "out-of-band" to the financial application (320). In other words, their contributions are based on information obtained through extensive interviews and translated into product requirements. The software capabilities meeting these requirements are then implemented in the financial application (320). For example, market analysts in France are engaged to provide the VAT rates and codes in an excel spreadsheet such that the software provider's engineers interpret and translate the inputs into tax metadata, such as the tax definitions (311) and tax accounting rules (312). The contribution management system (130) includes authoring tools and curating/validation capabilities that make it possible for accountants and other expert contributors to directly contribute their inputs into the financial application (320). Product managers and engineers of the software provider then curate such inputs, and upon validation, apply these inputs into the financial application (320).

In the case of SBOs, there is a long tail of right-for-me use cases that are too specific for tackling incrementally, even with the extended network of accountants and other paid experts. Some examples include specialized transactions such as rental deposit that only apply in real estate and other rent/hire oriented industries. The contribution management system (130) includes authoring tools and curating/validation capabilities that make it possible for the SBOs to define their own transaction types based on templates from existing, native transactions in the financial application (320). The SBOs may optionally share the customization with other SBOs in the user community of the financial application (320).

In summary, the authoring tools of the contribution management system (130) enable the right set of users to make their contributions in the right places in the financial application (320), and to have visibility into where their contributions are in the curation pipeline. Appropriate rewards/incentives are provided to encourage contributions that benefit the wider user community.

In addition to soliciting, incentivizing, curating and making such explicit contributions work for the benefit of the user community, the contribution management system (130) includes self-learning and predictive capabilities. For example, collaborative filtering techniques are used to obtain implicit contributions based on how SBO users manually configure the financial application (320). Recommendations are generated and presented to other businesses similar to the contributing SBO. For example, if it is observed that a significant number of businesses in California adjusted their base sales tax rates starting Jan. 1, 2016, recommendation may be made to other SBOs subject to the sales tax regime of California.

Figure 4:
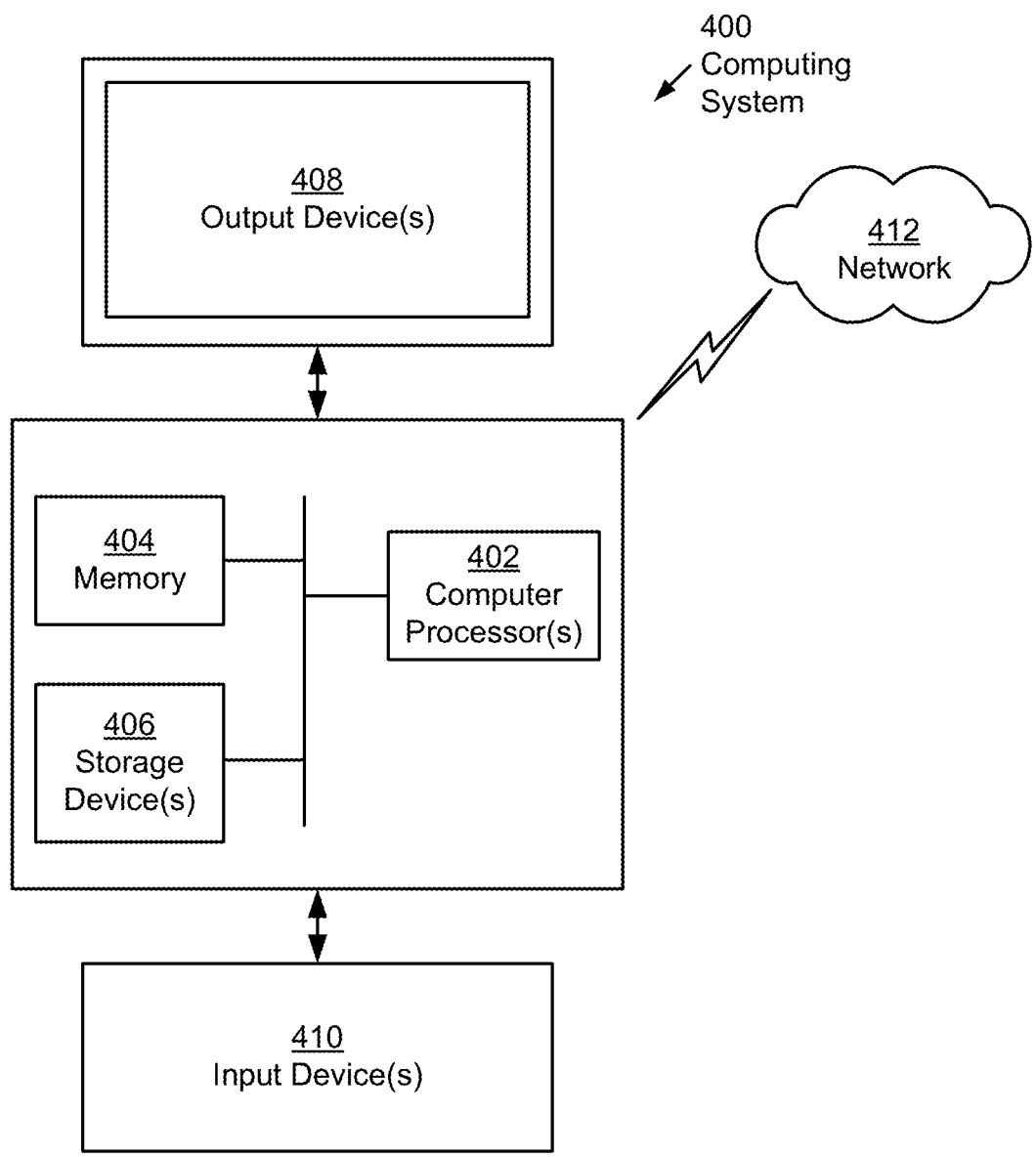
FIG. 4 shows a diagram of a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
 selecting, based on a user attribute of a user, a configurable user interface from a plurality of configurable user interfaces of the software solution;
 selecting, based on the user attribute of the user, a configurable workflow from a plurality of configurable workflows of the software solution,
  wherein the user attribute comprises a geographical region of the user based on a user location, and
  wherein the configurable user interface and the configurable workflow are automatically generated based on the geographical region of the user;
 generating a statistical measure of a plurality of users by tracking the plurality of users using the plurality of configurable user interfaces and the plurality of configurable workflows to perform a pre-determined task according to the geographical region of the user;
 verifying the plurality of configurable user interfaces and the plurality of configurable workflows based on the statistical measure, wherein the configurable user interface and the configurable workflow are defined based on at least a compliance requirement of the geographical region;
 obtaining the compliance requirement from an external regulatory agency of the geographical region; and
 performing the pre-determined task of the user by at least:
  receiving, from the user via the configurable user interface, a user input, and
  executing, based on user input and according to the configurable workflow, a plurality of functional engines of the software solution.

2. The method of claim 1,
 wherein the user attribute further comprises a business characteristic of the user, and
 wherein the configurable user interface and the configurable workflow are defined further based on the business characteristic of the user.

3. The method of claim 1, further comprising:
 obtaining, from a contributing user, a suggestion to customize the software solution, wherein the suggestion is based on a business requirement specific to the user attribute of the user;
 obtaining, from a moderator user and in response to reviewing the business requirement specific to the user attribute of the user, a moderator input regarding the suggestion; and
 generating the plurality of configurable user interfaces and the plurality of configurable workflows based at least on the suggestion and the moderator input.

4. The method of claim 1, wherein performing the pre-determined task of the user is further by configuring, prior to executing, the plurality of functional engines of the software solution based on the user attribute of the user.

5. The method of claim 4, the further comprising:
 generating a statistical measure of a plurality of users using the plurality of configurable user interfaces, the plurality of configurable workflows, and the plurality of configuration parameters to perform the pre-determined task; and
 verifying the plurality of configurable user interfaces, the plurality of configurable workflows, and the plurality of configuration parameters based on the statistical measure.

6. The method of claim 5,
wherein the plurality of users comprises the user and the contributing user,
wherein verifying the plurality of configurable user interfaces, the plurality of configurable workflows, and the plurality of configuration parameters is by using a machine learning algorithm that is based on at least the user attribute and the contributing user attribute, and
wherein the plurality of configurable user interfaces and the plurality of configurable workflows are selected, as a recommendation to the user, by at least matching the user attribute and the contributing user attribute.

7. A non-transitory computer readable medium storing instructions, the instructions, when executed by a computer processor, comprising functionality for:
  selecting, based on a user attribute of a user, a configurable user interface from a plurality of configurable user interfaces of the software solution;
  selecting, based on the user attribute of the user, a configurable workflow from a plurality of configurable workflows of the software solution,
    wherein the user attribute comprises a geographical region of the user based on a user location, and
    wherein the configurable user interface and the configurable workflow are automatically generated based on the geographical region of the user;
  generating a statistical measure of a plurality of users by tracking the plurality of users using the plurality of configurable user interfaces and the plurality of configurable workflows to perform a pre-determined task according to the geographical region of the user, and
  verifying the plurality of configurable user interfaces and the plurality of configurable workflows based on the statistical measure, wherein the configurable user interface and the configurable workflow are defined based on at least a compliance requirement of the geographical region;
  obtaining the compliance requirement from an external regulatory agency of the geographical region; and
  performing the pre-determined task of the user by at least:
    receiving, from the user via the configurable user interface, a user input, and
    executing, based on user input and according to the configurable workflow, a plurality of functional engines of the software solution.

8. The non-transitory computer readable medium of claim 7, the instructions, when executed by the computer processor, further comprising functionality for:
  obtaining, from a contributing user, a suggestion to customize the software solution, wherein the suggestion is based on a business requirement specific to the user attribute of the user;
  obtaining, from a moderator user and in response to reviewing the business requirement specific to the user attribute of the user, a moderator input regarding the suggestion; and
  generating the plurality of configurable user interfaces and the plurality of configurable workflows based at least on the suggestion and the moderator input,
  wherein the user attribute comprises at least one selected from a group consisting of a geographical region of the user and a business characteristic of the user.

9. The non-transitory computer readable medium of claim 7,
wherein the user attribute further comprises a business characteristic of the user, and
wherein the configurable user interface and the configurable workflow are defined further based on the business characteristic of the user.

10. A system comprising:
a computer processor;
memory;
a configuration service stored in memory and executing on the computer processor to:
  select, based on a user attribute of a user, a configurable user interface from a plurality of configurable user interfaces of the software solution, and
  select, based on the user attribute of the user, a configurable workflow from a plurality of configurable workflows of the software solution,
    wherein the user attribute comprises a geographical region of the user based on a user location, and
    wherein the configurable user interface and the configurable workflow are automatically generated based on the geographical region of the user;
a contribution management system stored in memory and executing on the computer processor that:
  generates a statistical measure of a plurality of users by tracking the plurality of users using the plurality of configurable user interfaces and the plurality of configurable workflows to perform a pre-determined task according to the geographical region of the user,
  verifies the plurality of configurable user interfaces and the plurality of configurable workflows based on the statistical measure, wherein the configurable user interface and the configurable workflow are defined based on at least a compliance requirement of the geographical region, and obtains the compliance requirement from an external regulatory agency of the geographical region;
a computer server to perform the pre-determined task executing on the computer processor by at least:
  receiving, via the configurable user interface, a user input, and
  executing, based on user input and according to the configurable workflow, a plurality of functional engines of the software solution; and
a data repository storing the plurality of configurable user interfaces and the plurality of configurable workflows.

11. The system of claim 10,
wherein the user attribute further comprises a business characteristic of the user, and
wherein the configurable user interface and the configurable workflow are defined further based on the business characteristic of the user.

12. The system of claim 10,
wherein the contribution management system:
  obtains, from a contributing user, a suggestion to customize the software solution, wherein the suggestion is based on a business requirement specific to the user attribute of the user,
  obtains, from a moderator user and in response to reviewing the business requirement specific to the user attribute of the user, a moderator input regarding the suggestion, and
  generates the plurality of configurable user interfaces and the plurality of configurable workflows based at least on the suggestion and the moderator input.

13. The system of claim 10, wherein performing the pre-determined task of the user is further by configuring, prior to executing, the plurality of functional engines of the software solution based on the user attribute of the user.

14. The system of claim 13, the contribution management system further that:
- obtains, from a contributing user, a suggestion to customize the software solution, wherein the suggestion is based on a business requirement specific to a contributing user attribute of the contributing user, and
- generates the plurality of configurable user interfaces, the plurality of configurable workflows, and a plurality of configuration parameters based at least on the suggestion,
- wherein configuring, prior to executing, the plurality of functional engines of the software solution is further based on the plurality of configuration parameters.

15. The system of claim 14,
- wherein the plurality of users comprises the user and the contributing user,
- wherein the contribution management system verifies the plurality of configurable user interfaces, the plurality of configurable workflows, and the plurality of configuration parameters using a machine learning algorithm that is based on at least the user attribute and the contributing user attribute, and
- wherein the configuration service selects, as a recommendation to the user, the plurality of configurable user interfaces and the plurality of configurable workflows by at least matching the user attribute and the contributing user attribute.

* * * * *